(12) United States Patent
Balachandran

(10) Patent No.: US 9,317,260 B2
(45) Date of Patent: Apr. 19, 2016

(54) QUERY-BY-EXAMPLE IN LARGE-SCALE CODE REPOSITORIES

(71) Applicant: VMware, Inc., Palo Alto, CA (US)

(72) Inventor: Vipin Balachandran, Banglore (IN)

(73) Assignee: VMware, Inc., Palo Alto, CA (US)

( * ) Notice: Subject to any disclaimer, the term of this patent is extended or adjusted under 35 U.S.C. 154(b) by 211 days.

(21) Appl. No.: 13/962,980

(22) Filed: Aug. 9, 2013

(65) Prior Publication Data

US 2015/0046492 A1  Feb. 12, 2015

(51) Int. Cl.
 *G06F 7/00* (2006.01)
 *G06F 17/30* (2006.01)
 *G06F 9/44* (2006.01)

(52) U.S. Cl.
 CPC .................................. *G06F 8/36* (2013.01)

(58) Field of Classification Search
 CPC ............... G06F 17/30669; G06F 17/30675; G06F 17/2785; G06F 17/3053; G06F 17/30; G06F 17/30011; G06F 17/2247; G06F 17/30253; G06F 17/30312; G06F 17/30637; Y10S 707/99936
 See application file for complete search history.

(56) References Cited

U.S. PATENT DOCUMENTS

| | | | |
|---|---|---|---|
| 6,598,042 B1 * | 7/2003 | Kienan ................ | G06F 17/3064 |
| 6,658,404 B1 * | 12/2003 | Cecchini ......................... | 707/758 |
| 7,430,562 B1 * | 9/2008 | Bedell ................ | G06F 17/30463 |
| 7,613,693 B1 * | 11/2009 | Na et al. | |
| 8,005,870 B1 * | 8/2011 | Bedell et al. .................. | 707/802 |
| 8,589,411 B1 * | 11/2013 | Sung et al. ..................... | 707/748 |
| 8,601,015 B1 * | 12/2013 | Wolfram et al. ............... | 707/759 |
| 2003/0200206 A1 * | 10/2003 | de Judicibus ..... | G06F 17/30395 |
| 2008/0052674 A1 * | 2/2008 | Little ............................. | 717/120 |
| 2008/0147638 A1 * | 6/2008 | Hoeber et al. ..................... | 707/5 |
| 2008/0288474 A1 * | 11/2008 | Chin et al. ......................... | 707/4 |
| 2010/0211924 A1 * | 8/2010 | Begel et al. .................... | 717/101 |
| 2011/0213761 A1 * | 9/2011 | Song et al. ..................... | 707/706 |
| 2012/0226492 A1 * | 9/2012 | Tsuboi .............. | G06F 17/30684 704/9 |
| 2012/0254251 A1 * | 10/2012 | Barbosa et al. ............... | 707/797 |
| 2012/0254835 A1 * | 10/2012 | Muddu et al. ................. | 717/121 |
| 2013/0318091 A1 * | 11/2013 | Bhatia et al. .................. | 707/741 |
| 2014/0229473 A1 * | 8/2014 | Mehrotra et al. ............. | 707/728 |

FOREIGN PATENT DOCUMENTS

| | | |
|---|---|---|
| CA | 2426441 A1 * | 10/2004 |
| WO | WO 0103002 A2 * | 1/2001 |

OTHER PUBLICATIONS

Using structural context to Recommend Source COde Examples, Holmes et al, ICSE'05, pp. 117-125, 2005.*

(Continued)

*Primary Examiner* — Augustine K Obisesan

(57) ABSTRACT

Systems and methods for performing query-by-example are described. A query module executing on the system may maintain a source code repository containing a plurality of source code files. Each of the plurality of source code files is associated with a corresponding source syntax structure generated based on said each of the plurality of source code files. The query module may receive a query snippet, and generate a query syntax structure based on the query snippet. The query module may then identify a first source code file from the plurality of source code files for being relevant to the query snippet. The being relevant to the query snippet is determined by a first relevance score which is calculated based on the query syntax structure and the first source code file's corresponding source syntax structure.

20 Claims, 6 Drawing Sheets

(56) References Cited

OTHER PUBLICATIONS

A framework for source code search using program patterns, Paul et al., IEEE transactions on software engineering, 20(6), pp. 463-475, Jun. 1994.*

Oleksandr Panchenko et al., "Precise and scalable Querying of Syntactical Source Code Patterns Using Sample Code Snippets and a Database", 2011 IEEE 19th International Conference on Program Comprehension, Jun. 2011, pp. 41-50.

* cited by examiner

QUERY-BY-EXAMPLE IN LARGE-SCALE CODE REPOSITORIES

BACKGROUND

Software developers search code samples stored in a code repository in order to learn the usage of a particular programming interface, or perform refactoring tasks. Code search is normally performed using a search function of a software development tool (e.g., Eclipse®), or a source code search engine such as OpenGrok®. These search tools allow searching for language-specific syntactic elements such as method names or variable types. For example, using OpenGrok, software developers can search for Java class definitions, or locate the references of a particular symbol via symbol search. In Eclipse, pattern matching using regular expressions may also be supported. However, these search tools are mostly text-based, and mainly provide specific interpretations to certain syntactic elements. Even though some of the code search tasks can be performed using these text-based source code search engines, the software developers may be more interested in the syntactic patterns in the code samples, which cannot be easily discovered by these conventional search tools.

SUMMARY

Systems and methods for performing query-by-example are described. A query module executing on the system may maintain a source code repository containing a plurality of source code files. Each of the plurality of source code files is associated with a corresponding source syntax structure generated based on said each of the plurality of source code files. The query module may receive a query snippet, and generate a query syntax structure based on the query snippet. The query module may then identify a first source code file from the plurality of source code files for being relevant to the query snippet. The being relevant to the query snippet is determined by a first relevance score which is calculated based on the query syntax structure and the first source code file's corresponding source syntax structure.

DETAILED DESCRIPTION

Figure 1:
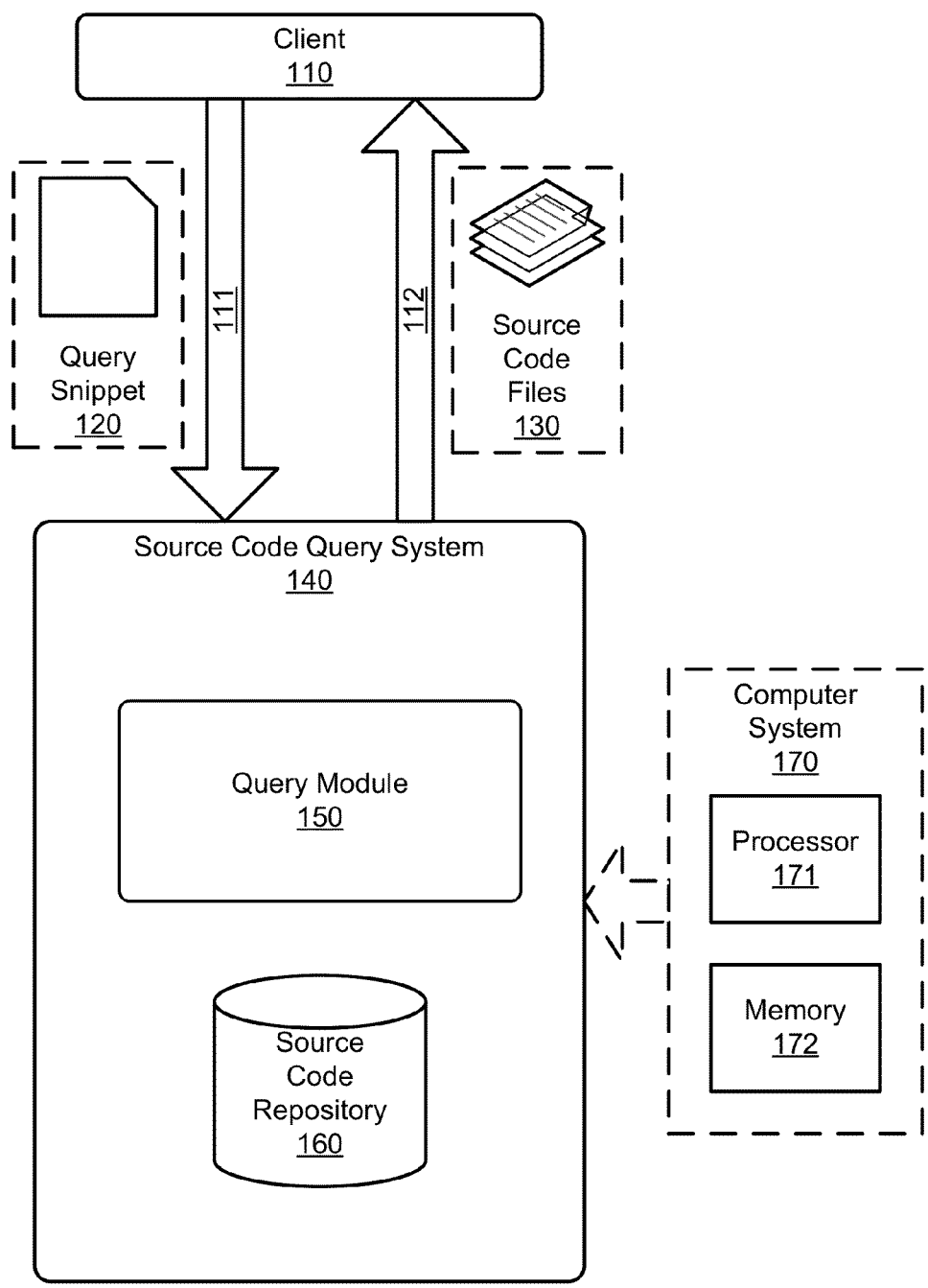
FIG. 1 illustrates a source code query environment configured to perform query-by-example.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

FIG. 1 illustrates a source code query environment configured to perform query-by-example, according to one or more embodiments of the present disclosure. In FIG. 1, a client 110 may be configured to transmit a request 111 to a source code query system 140, which may be configured with a query module 150 and a source code repository 160. Upon receiving the request 111, the query module 150 may extract a query snippet 120 from the request 111, and perform a query operation in order to retrieve one or more source code files 130 from the source code repository 160. Specifically, the retrieved source code files 130 may be deemed similar or relevant to the query snippet 120 in terms of syntactic structures and patterns. Afterward, the query module 150 and the source code query system 140 may embed the source code files 130 in a response 112, and transmit the response 112 back to the client 110.

In one embodiment, the query snippet 120 may contain a piece (or a section) of source code written in Java®, C/C++, C#®, or any other software language. A user may submit the query snippet 120 as a sample to the client 110, seeking to obtain additional source code that resembles the query snippet 120. The client 110 may be a computer system configured to transmit the query snippet 120 to the source code query system 140. Upon receiving the response 112, the client 110 may extract the source code files 130 from the response 112, and present the source code files 130 to the user.

In one embodiment, upon receiving the query snippet 120, the query module 150 may be configured to generate a "syntax structure" based on the query snippet 120. The "syntax structure" may be a hierarchical data structure configured for representing the syntactic structure of the query snippet 120. For example, the syntax structure may be a "Concrete Syntax Tree" or "Parse Tree", generated by a compiler or a parser based on the grammar of the underlying software language in which the query snippet 120 is developed. In another embodiment, the syntax structure may be an "Abstract Structure Tree" (AST), which may be a simplified and modified parse tree without certain syntactic elements which are not essential for syntactic analysis. For example, an AST generated based on a query snippet 120 written in C++ language may contain hierarchical nodes representing class definitions, method invocations, "for" loops, "if" statements, and/or other functional structures. However, the AST may not contain nodes for array subscripts or parentheses, all of which may be inferred from the hierarchical relationships among the hierarchical nodes.

In one embodiment, the query module 150 may optionally generate one or more "characteristic vectors" based on a specific syntax structure. The "characteristic vector" may be deemed a data structure that can precisely or approximately model the syntax structure. In other words, for a specific purpose, the "characteristic vector" may be deemed equivalent or highly resemble the syntax structure. Thus, rather than directly comparing the query snippet 120 against the source code files in the source code repository 160, the query module 150 may first "convert" the query snippet 120 into a corresponding "syntax structure" and/or one or more corresponding "characteristic vectors", and then utilize the syntax structure and/or the characteristic vectors in identifying the source code files 130 that resemble the query snippet 120.

In one embodiment, the source code repository 160 may contain a set of source code files previously processed by the query module 150. In other words, the query module 150 may generate one or more syntax structures and/or one or more corresponding characteristic vectors based on a specific source code file, similar to the generating of the syntax structure and characteristic vectors based on the query snippet 120. Afterward, the query module 150 may optionally store the one or more syntax structures and/or the one or more characteristic vectors along with the specific source code file in the source code repository 160 for quick retrieval. During a query-by-example operation, the query module 150 may compare the syntax structures associated with the source code files in the source code repository 160 with the syntax structure associated with the query snippet 120, or compare the characteristic vectors associated with the source code files with the characteristic vectors associated with the query snippet 120, in order to identify the source code file 130.

In one embodiment, the source code query system 140 may be implemented using a physical or a virtual computer system 170. The computer system 170 may be configured with, among other physical or virtual hardware components, one or more processors 171 and memory 172. The processor 171 may include central processing units (CPUs) for controlling the overall operation of the source code query system 140, and for executing software or firmware stored in memory 172. The processor 171 may be or may include, one or more programmable general-purpose or special-purpose microprocessors, digital signal processors (DSPs), programmable controllers, application specific integrated circuits (ASICs), programmable logic devices (PLDs), graphical processing units (GPUs) or the like, or a combination of such devices. The memory 172 may represent any form of random access memory (RAM), read-only memory (ROM), flash memory (as discussed above), or the like, or a combination of such devices. In use, the memory 172 may contain, among other things, a set of non-transitory machine readable instructions which, when executed by the processor 171, causing the processor 171 to perform one or more embodiments of the present disclosure.

Figure 2:
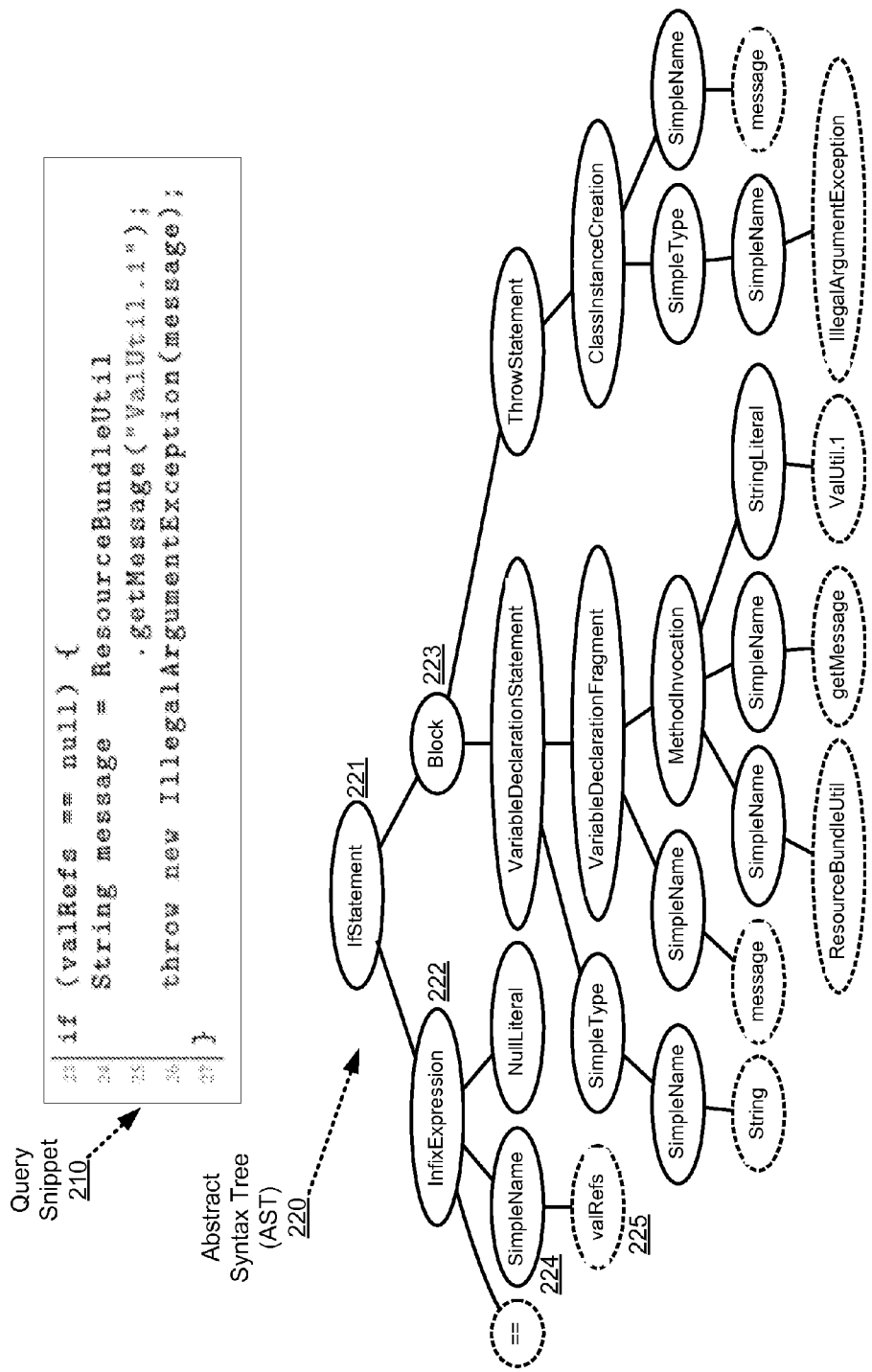
FIG. 2 illustrates a syntax structure generated based on a query snippet.

FIG. 2 illustrates a syntax structure generated based on a query snippet, according to one or more embodiments of the present disclosure. In FIG. 2, a query snippet 210, which may be similar to the query snippet 120 of FIG. 1, may be transmitted to a source code query system (similar to the source code query system 140 of FIG. 1, not shown in FIG. 2). A query module of the source code query system may process the query snippet 210, and generate a syntax structure 220. In one embodiment, the query module may first utilize a parser (e.g., an Eclipse® JDT Core parser) to construct a parse tree. Afterward, the query module may modify, remove, or rearrange some of the nodes, or create new nodes, in the parse tree in order to generate the syntax structure 220.

In one embodiment, the syntax structure 220 may be an Abstract Structure Tree (AST), which may contain one or more rooted, labeled, and ordered nodes associated with syntactic elements in the query snippet 210. For example, the "if" statement in line 23 of the query snippet 210 may be represented by a root node 221 labeled "IfStatement" in the AST 220. The root node 221 may contain two child nodes 222 and 223. The left child node 222, which is labeled "InfixExpression", may represent the "if" condition "valRefs==null" in the query snippet 210. The right child node 223, which is labeled "Block", may represent the block of code in lines 24-26 of the query snippet 210.

In one embodiment, when the parser generated a parse tree that contains certain ignorable syntactic elements (e.g., braces, semicolons, or parentheses), the query module may remove some of the nodes in the parse tree that correspond to these ignorable syntactic elements in order to generate the AST 220. Alternatively, the parser may generate an AST which has no node associated with these ignorable syntactic elements. In one embodiment, the query module may convert some of the attributes contained in some the nodes of the parse tree or AST into leaf nodes for the AST 220. For example, a node 224 in the parse tree or AST may contain a "value" attribute for storing a variable's name (e.g., "valRefs"). In this case, the query module may extract the "value" attribute from the parse tree or AST, and construct a leaf node 225 in the AST 220 for storing the "valRefs" value. Thus, the AST 220 may contain leaf nodes (indicated by dotted ellipses in the AST 220) that represent the type names, identifier names, operators, and/or string literals in the query snippet 210. Such an approach may be advantageous since by converting some of the interested attributes of the nodes to regular nodes in the AST 220, the query module may not have to deal with two different types of nodes: one with attribute, and one without attribute.

In one embodiment, the query module may store meta-data of the query snippet 210 along with the nodes of the AST 220. For example, for a specific node in the AST 220 which is generated based on a block of code in the query snippet 210, the query module may store the start line and end line for the block of code in the specific node. For a leaf node of the AST 220 that is associated with a variable, the query module may also store the variable's specific location (e.g., line and position in the query snippet 210) along with the leaf node. Alternatively, the query module may also store meta-data of the source code files along with the nodes of the ASTs associated with the source code files.

In one embodiment, the query module may utilize the AST 220 to perform source code comparison. To determine whether the query snippet 210 may be identical or similar to a source code file, the query module may generate a "source AST" for the source code file, similar to the generating of the AST 220 ("query AST") based on the query snippet 210. Afterward, the query module may compare the query AST 220 with the source AST and determine similarity accordingly. The details about performing query-by-example using ASTs are further described below.

Figure 3:
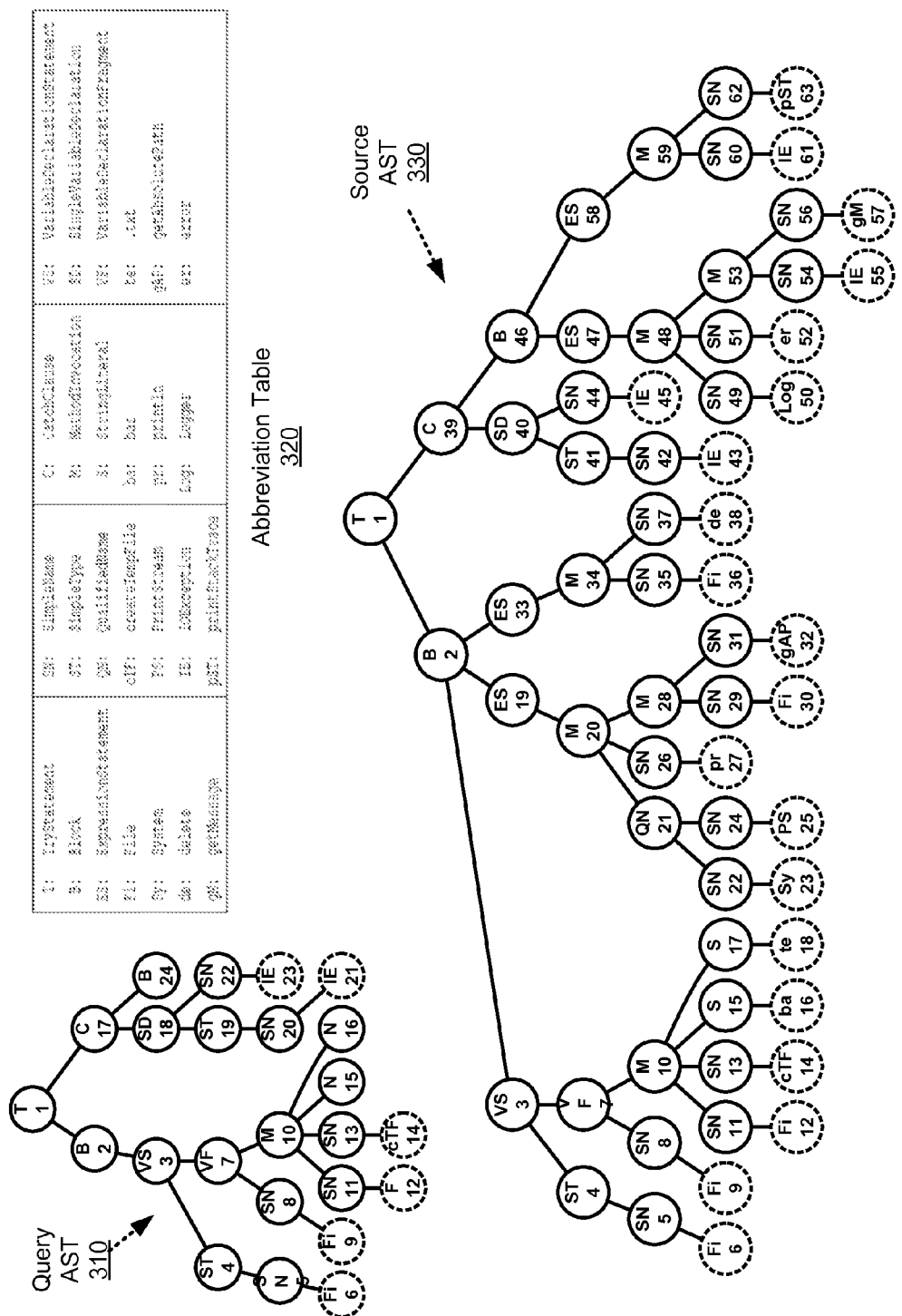
FIG. 3 illustrates multiple syntax structures generated based on a query snippet and a source code file.

FIG. 3 illustrates multiple syntax structures generated based on a query snippet and a source code file, according to one or more embodiments of the present disclosure. In FIG. 3, a query snippet, which is shown in the following Table 1, may be transmitted to a source code query system (similar to the source code query system 140 of FIG. 1, not shown in FIG. 3). A query module of the source code query system may process the query snippet, and generate a syntax structure 310. Further, the query module may retrieve a source code file, a segment of which is shown in the following Table 2, and generate a corresponding syntax structure 330. In one embodiment, the syntax structure 310 may be an AST (hereinafter "query AST"), and the syntax structure 330 may also be an AST (hereinafter "source AST").

In one embodiment, the "query-by-example" operation performed by the query module may be defined as the following: given a source code repository R with n source code files, and a query snippet q, the query module may return the top-k source code files in R that "match" the query snippet q, ordered by the source code files' corresponding similarity and relevance scores. In other words, a source code file and a query snippet may be deemed "matching" with one another when the source code file contains syntactic patterns/structures similar to that of the query snippet, or vice versa. Also, a "similarity score", which is used to determine the similarity between syntactic patters/structures of the source code files and that of the query snippet, may be calculated based on tree similarity algorithms such as the "tree edit distance" algorithm.

For example, a user may be interested in understanding how the "IOException" thrown by "File.createTempFile" API call should be handled in the existing source code files. The user may perform a symbol search based on "File.createTempFile", and the source code query system may return source code files that catch a super-class exception (e.g., "Exception") or re-throw a super-class exception. The user may issue another symbol search based on "IOException", which may return source code files with API calls that throw this generic exception "IOException." Further, the user may use method name "createTempFile" (which may be a very common identifier) or the variable names ("file" or "f") to search for matching source code files. However, the above approaches may yield source code files that are not relevant to the query snippet in Table 1.

In one embodiment, rather than performing symbol search, the user may issue a query-by-example search by submitting the query snippet (shown in the following Table 1) to the source code query system. The query module may process the query snippet and generate a query AST 310 as shown in FIG. 3. In the query AST 310, each node is labeled with an abbreviation which is explained in the abbreviation table 320. The nodes of the query AST 310 may also be numbered based on a depth-first order. For example, node 1 in query AST 310 may represent line 1 in Table 1; node 3 may represent line 2; and node 17 may represent line 3. Further, some of the leaf nodes (e.g., nodes 6, 9, 21, and 23), which represent type names (e.g., File) or identifier name (e.g., "file"), may be shown by dotted eclipses in query AST 310.

TABLE 1

Query Snippet

1: try {
2: File file = File.createTempFile(null, null);
3: } catch (IOException e) {
4: }

In one embodiment, the query module may select a source code file from the source code repository and generate a source AST 330 as shown in FIG. 3 based on the source code file. The query module may either generate the source AST 330 beforehand, or after the selecting of the source code file from the source code repository. For illustrative purposes, Table 2 may show a segment of source code file. Thus, the source AST 330 may actually be a sub-tree of the source AST generated based on the whole source code file. In the source AST 330, each node is labeled with an abbreviation which is explained in the abbreviation table 320. The nodes of the source AST 330 may also be numbered based on a depth-first order.

TABLE 2

Source Code Segment

29: try {
30:   File f = File.createTempFile("bar", ".txt");
31:   System.out.println(f.getAbsolutePath( ));
32:   f.delete( );

TABLE 2-continued

Source Code Segment

33: } catch (IOException e) {
34:   logger.error(e.getMessage( ));
35:   e.printStackTrace( );
36: }

In one embodiment, the "try-catch" statement in lines 29-36 of the Table 2 may be represented by node 1 in source AST 330. Similarly, the left child node 2 may represent the "try" block in lines 30-32, and the right child node 39 may represent the "catch" clause in lines 33-35. The child nodes of node 2, including node 3, node 19, and node 33, may correspond to lines 30, 31, and 32 of Table 2 respectively. Also, the exception declaration in line 33 and the catch block in lines 34-35 may be represented by nodes 40 and 46 respectively. To handle the above cases, the query module may replace the variable identifier labels with the corresponding type names. For example, the query module may rename the labels of node 9 and node 30 in source AST 330 from "file" or "f" (identifier) to "File" (type).

In one situation, a sub-tree (branch) of the source AST may match the query AST. However, due to the difference in the sizes of the source AST and the query AST, the similarity score generated based on the source AST and the query AST may indicate a low similarity because there is no sub-tree in the query AST that matches some of the sub-trees in the source AST. In another case, there may not exist a single sub-tree in the source AST which matches the whole query AST. However, multiple sub-trees, which may not share a common parent node in the source AST, may match different sub-trees of the query AST. Therefore, rather than processing the source AST and the query AST as a whole, the query module may extract one or more sub-trees from the source AST ("source sub-trees") and one or more sub-trees from the query AST ("query sub-trees"), and compute the similarity score based on the query sub-trees and the source sub-trees. A sub-tree may also be referred to as a "syntax sub-structure" in a syntax structure.

To simplify the query-by-example operation, the query module may extract those query sub-trees and source sub-trees having a minimum size above a predetermined configurable size threshold (e.g., "3"). For example, the query module may extract those query sub-trees from the query AST (and those source sub-trees from the source AST) that contain at least 3 nodes. Afterward, the query module may select a specific query sub-tree, and compare the specific query sub-tree with those source sub-trees that have the same "root node" label (or type) as the specific query sub-tree. For example, for a specific query sub-tree with a "root node" label of "MethodInvocation", the query module may select those source sub-trees that have the same "MethodInvocation" as their "root node" label for similarity comparison.

In one embodiment, the query module may perform a tree similarity function to calculate a "similarity score" between a pair of source sub-tree $ST_{source}$ and query sub-tree $ST_{query}$. For example, the query module may generate the "similarity score" based on a "matching tree pattern" in the $ST_{source}$ and $ST_{query}$. Alternatively, the query module may utilize a "tree edit distance" to determine the "similarity score." Further, the query module may convert the $ST_{source}$ and $ST_{query}$ into "characteristic vectors", and generate the similarity score based on these characteristic vectors. Based on the similarity score, the query module may determine that there is sufficient similarity between the $ST_{source}$ and $ST_{query}$, and utilize the $ST_{source}$ and $ST_{query}$ pair for further relevance determination, as described below.

In one embodiment, the query module may compute the "similarity score" by first identifying whether there is any "matching tree pattern" in the $ST_{source}$ and $ST_{query}$. The "matching tree pattern" may include a subset of nodes and structures which are present in both the $ST_{source}$ and the $ST_{query}$. Using FIG. 3's example, when comparing a $ST_{query}$ (including nodes 3-16 of the query AST 310, with node 3 as its root node) with a $ST_{source}$ (including nodes 20-32 of the source AST 330, with node 20 as its root node), the query module may identify a matching tree pattern, which includes nodes 10-13 of query AST 310 in $ST_{query}$, verses nodes 28-31 of source AST 330 in $ST_{source}$.

In one embodiment, the query module may calculate the similarity score based on how big a portion (in percentage) the matching tree pattern covers in the $ST_{source}$ and in the $ST_{query}$, based on a number of nodes in the matching tree pattern, in the $ST_{source}$, and in the $ST_{query}$. The query module may use $P_{source}$ to store the percentage of nodes covered by the matching tree pattern in $ST_{source}$, and use $P_{query}$ to store the percentage of nodes covered by the matching tree pattern in $ST_{query}$. Continuing in the above example, the matching tree pattern (4 nodes) may occupy 29% of the nodes in the $ST_{query}$ (14 nodes of the query AST 310), and 31% of the nodes in the $ST_{source}$ (13 nodes of the source AST 330). As a result, the $P_{query}$ value may be 29%, and the $P_{source}$ value may be 31%. Afterward, the query module may calculate "similarity score" based on the $P_{source}$ and $P_{query}$. For example, the similarity score may be the minimum of the $P_{source}$ and the $P_{query}$: $\min(P_{source}, P_{query})$, which is 29% in the above example.

In one embodiment, the query module may determine that the $ST_{source}$ matches the $ST_{query}$, or the $ST_{query}$ matches the $ST_{source}$, if the "similarity score" calculated based on the matching tree pattern meets or exceeds a predetermined and configurable percentage matching threshold (e.g., 75% or more). In other words, when the $ST_{query}$ and the $ST_{source}$ contain more than 75% common syntactic structures, the query module may deem the $ST_{query}$ and the $ST_{source}$ pair sufficiently similar. Further, for a specific $ST_{query}$, there might be one or more $ST_{source}$ that contain matching tree patterns. Thus, by using the above percentage threshold, the query module may be able to select the better one or more $ST_{source}$ for matching with the $ST_{query}$, according to one or more embodiments described below.

In one embodiment, the query module may evaluate the one or more identified source sub-trees, and discard those source sub-trees that may be "subsumed by" (completely or substantially contained in) other matching source sub-trees. For example, an identified $ST_{source}$ having "root node 4" in the source AST 330 may be covered by another identified $ST_{source}$ having "root node 3" in the source AST 330. Thus, the query module may aggregate the source sub-trees by including the source sub-tree having root node 3, but not the source sub-tree having root node 4, for further processing.

In one embodiment, the query module may compute the "similarity score" based on "tree edit distance" between the $ST_{source}$ and $ST_{query}$. The "tree edit distance" is a commonly used tree similarity measurement based on tree-editing operations such as insert, delete, and re-label. Specifically, in an insert operation, a new node may be inserted to the AST. In a delete operation, an existing node may be removed from the AST. The re-label or substitute operation may replace a node label with another label. The "tree edit distance" may store a minimum number of tree-editing operations required to convert a tree $T_1$ to a tree $T_2$. Therefore, the more similar tree $T_1$ is compared to tree $T_2$, the smaller the "tree edit distance" is for tree $T_1$ and tree $T_2$.

In one embodiment, the query module may assign a cost $c_i$ to each of the above tree-editing operations. Thus, the cost of an "operation sequence E"=$\langle e_1, e_2, \ldots, e_n \rangle$ required to change tree $T_1$ to tree $T_2$ may be the sum of the cost of each individual tree-editing operation in the operation sequence. Further, all the "operation sequences" that may transform tree $T_1$ to tree $T_2$ may be deemed $S_E$. Thus, the tree edit distance "ted($T_1$, $T_2$)" between $T_1$ and $T_2$ may be defined as the minimum "edit operation sequence cost" for all tree-editing operation sequences in $S_E$. In other words, $$\text{ted}(T_1, T_2) = \min\{\text{Cost}(E) : E \in S_E\}$$

In one embodiment, the query module may calculate the similarity score using the "ted($ST_{source}$, $ST_{query}$)" value. Thus, the query module may determine that the $ST_{source}$ matches the $ST_{query}$, or the $ST_{query}$ matches the $ST_{source}$, if the "similarity score" calculated based on the above tree edit distance falls below a predetermined and configurable distance threshold (e.g., lower than 10).

Figure 4:
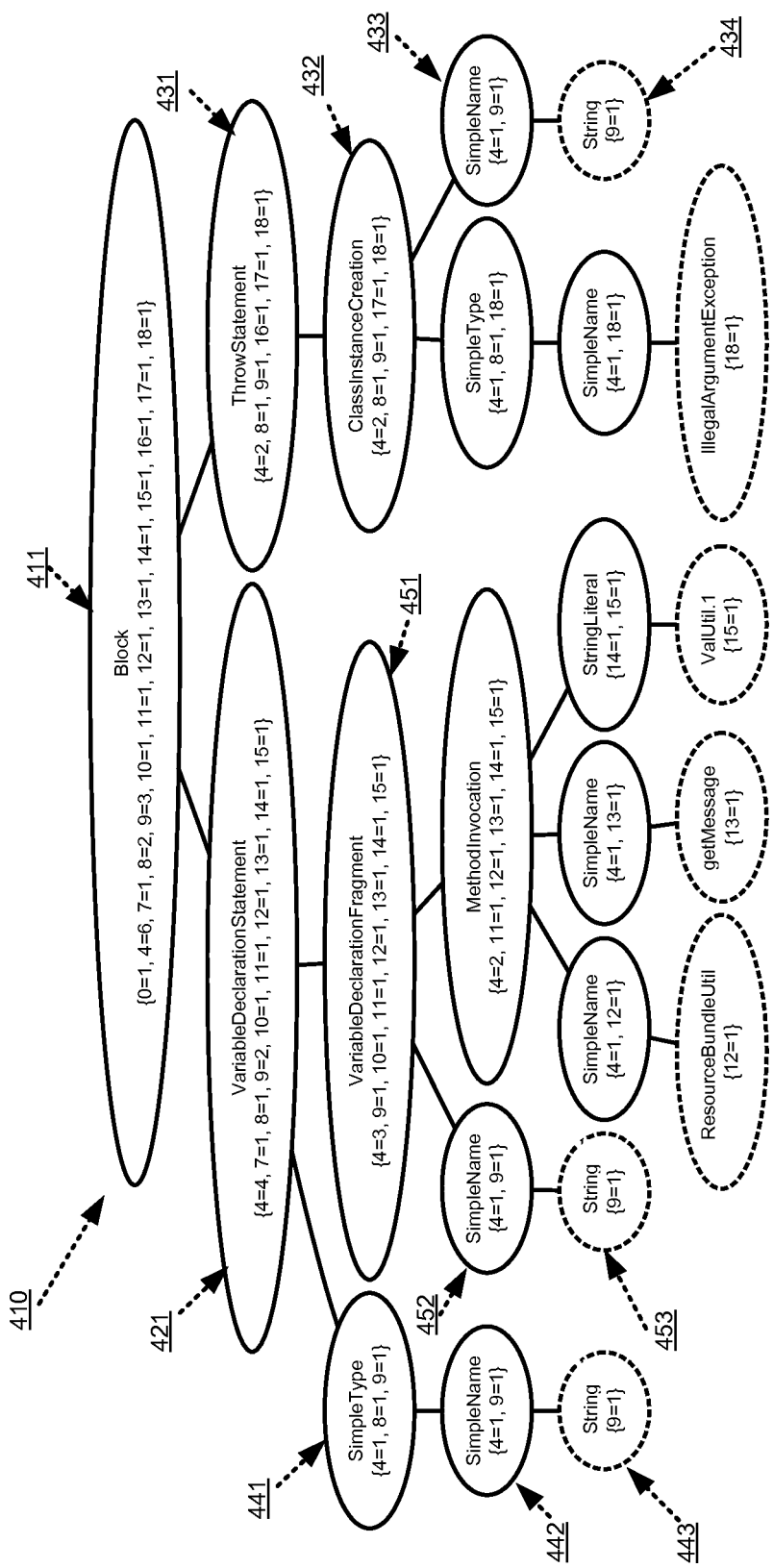
FIG. 4 illustrates characteristic vectors associated with a syntax structure.

FIG. 4 illustrates characteristic vectors associated with a syntax structure, according to one or more embodiments of the present disclosure. In FIG. 4, an AST 410 may be a sub-tree of the AST 220 in FIG. 2 (having node 223 as its root node). Alternatively, the AST 410 may be a query AST generated based on a query snippet, a source AST generated based on a source code file, or a sub-tree of the query AST or the source AST.

In one embodiment, when comparing a query AST (or its sub-trees) with a large source AST, generating the similarity score based on the "tree edit distance" approach described above may be computationally expensive. In this case, the query module may utilize an "approximated tree edit distance" approach in generating the similarity score. Specifically, the query module may first convert tree $T_1$ and tree $T_2$ into two corresponding "characteristic vectors", and then generate the similarity score between tree $T_1$ and tree $T_2$ based on a "Euclidean distance" between these two "characteristic vectors." In other words, the query module may estimate the tree edit distance between tree $T_1$ and tree $T_2$ using the Euclidean distance between these two "characteristic vectors."

In one embodiment, the Euclidean distance "eud" between two n-dimensional vectors $\tilde{p}$ and $\tilde{q}$ may be defined as:

$$eud(\tilde{p}, \tilde{q}) = \sqrt{\sum_{i=1}^{n} (p_i - q_i)^2}$$

wherein $p_i$ may represent a specific dimension value in vector $\tilde{p}$, and $q_i$ may represent a corresponding dimension value in vector $\tilde{q}$. A "q-level atomic pattern" may be defined as a complete binary tree of height q. Given a label set L, including the empty label, there are at most $|L|^{2^{q-1}}$ distinct q-level atomic patterns. Thus, given a tree T, a "q-level characteristic vector" for T may be defined as $\langle b_1, b_2, \ldots, b_{|L|^{2^{q-1}}} \rangle$, wherein $b_i$ is the number of occurrence of the i-th q-level atomic pattern in T.

In one embodiment, based on the above "q-level characteristic vector" definition, the "Euclidean distance" eud($\tilde{v}_q(T_1)$, $\tilde{v}_q(T2)$) between two corresponding q-level characteristic vectors vq(T1) and vq(T2) may be estimated based on the following formula:

$$\sqrt{1^1 - \text{norm}(\tilde{v}_q(T_1), \tilde{v}_q(T_2))} \leq eud(\tilde{v}_q(T_1), \tilde{v}_q(T_2)) \leq (4q-3)k$$

in which a tree edit distance ted($T_1$, $T_2$) between $T_1$ and $T_2$ is k. Further, a "q-level characteristic vector" (e.g., a 1-level character vector) for a tree T may be an "n-dimensional vector", where n represents a number of terms, words, or labels extracted from the tree T. The query module may adjust an n-dimensional vector using one or more weights or factors. For example, a frequency weight, which is associated with a specific term's frequency of occurrence in the T, may be used to adjust the specific term's dimension in the n-dimensional vectors.

In one embodiment, the query module may generate one or more characteristic vectors ("query characteristic vectors" or "query vectors") based on a query AST, and generate one or more characteristic vectors ("source characteristic vectors" or "source vectors") based on a source AST. Each of the above "characteristic vectors" may be a 1-level n-dimensional vector that can represent the "structure characteristic" of the corresponding AST. Further, the query module may generate a corresponding characteristic vector for each of the nodes in the AST.

In one embodiment, the query module may generate a 1-level characteristic vector for an AST by recursively generating corresponding characteristic vectors for the child nodes in the AST. In other words, for a specific node n in the AST, the query module may first identify the node n's label, and treat the label as a specific dimension in the characteristic vector associated with the specific node n ("root characteristic vector"). The specific dimension may be assigned with a frequency value "1." Afterward, the query module may recursively calculate the characteristic vectors for the child nodes of the specific node n in a similar fashion, and then merge the child nodes' characteristic vectors into the root characteristic vector. Specifically, for each child characteristic vector associated with a child node of the node n, the query module may extract one or more dimensions from the child characteristic vector, and accumulate the one or more dimensions to the corresponding dimensions in the root characteristic vector based on the following process: if the root characteristic vector does not have a dimension "X" which a child characteristic vector has, the dimension "X" of the child characteristic vector may be assigned to the root characteristic vector. Otherwise, the frequency value associated with the dimension "X" in the child characteristic vector may be added into the frequency value associated with the same dimension in the root characteristic vector.

For example, in FIG. 4, for each node in the AST 410, the query module may generate and associate a corresponding characteristic vector with such a node. Each dimension in the characteristic vectors in FIG. 4 may be represented by a format "dimension_id=frequency." Thus, for a specific node in the AST 410, its associated character vector may have a specific dimension of the n-dimension identified by a "dimension_id", and a "frequency" value associated with the specific dimension for storing a number of times the specific dimension is present in the sub-tree having the specific node as its root node in the AST 410. For example, the query module may first generate and associate a characteristic vector "{9=1}" to node 443. That is, the query module may identify the node 443's label "String" as a dimension "9", and assign a frequency of occurrence ("1") of such label to the dimension "9" for the node 443. Based on the node 443, the query module may calculate and associate a second characteristic vector "{4=1,9=1}" to node 442. Thus, the node 442 may contain two dimensions, one being dimension "4", which is associated with the node 442's label "SimpleName", and the other being dimension "9", which is inherited from the node 443. Further, the dimension "4" has a frequency value of "1", meaning that a number of occurrences of the label "SimpleName" in the sub-tree having the node 442 as its root node is "1." The dimension "9" has a frequency value of "1" as well, since a number of occurrences of the label "String" in the sub-tree having the node 442 as its root node is also "1."

Thus, with respect to the root node 411, the query module may generate and associate a characteristic vector which contains dimensions from all the child nodes of the node 411. In other words, for each dimension in the node 411's characteristic vector, its frequency may indicate how many nodes (including node 411 and its child nodes) may have a label that is associated with such a dimension. For example, since there are three nodes (nodes 443, 453, and 434) in the AST 410 that have "String" as their labels, the characteristic vector for node 411 may have a frequency value "3" for dimension "9" ("{9=3}"), meaning there are "3" occurrences of the label "String" in the nodes of the AST 410.

In one embodiment, for each characteristic vector generated based on a specific node in the AST, the query module may associate the characteristic vector with the specific node's node type, node label, as well as meta-data information related to the specific node's parent node and/or child nodes. Optionally, the query module may associate the characteristic vector with the sub-tree in the AST having the node as its root node. Further, the query module may associate the characteristic vector with the source code file the source AST is generated from, as well as the specific start line and end line the specific node is located in the source code file.

In one embodiment, after generating the corresponding query vectors and the source vectors, the query module may select a specific query vector from the query vectors for having a vector size (a number of nodes in the vector) that is above a predetermined and configurable vector threshold (e.g., "3"), and try to match the specific query vector with one or more source vectors that have the similar vector size and node label/type. The query module may implement a hash table with the source AST's node label/type as the hash key, and a value set containing a list of characteristic vectors that are associated with those sub-trees of the AST whose root node label/type matches the key. Afterward, the query module may first identify a set of source vectors from the hash table by using the query vector's associated node label/type as a hash key, and then use the vector size to narrow down the candidate source vectors.

In one embodiment, for the specific query vector and one of the source vectors, the query module may generate a corresponding "similarity score" by computing a Euclidean distance between the specific query vector and the source vector. Upon a determination that the similarity score is below a predetermined and configurable distance threshold (e.g., below 10), the query module may determine that the query sub-tree associated with the query vector is deemed similar to the source sub-tree associated with the source vector. Based on the above approaches, the query module may be able to identify the source code files containing syntax structures, tree patterns, sub-trees, and characteristic vectors that match the corresponding counterparts in the query snippet.

In one embodiment, the query module may determine a "relevance score" for each of the source code files that contain matching components with respect to the query snippet, and utilize the relevance scores to select top-k number of source code files. The selected top-k number of source code files may be deemed relevant to the query snippet. Further, the process to determine "relevance score" may be illustrated using the pseudo code listed in the following Table 3. In other words, the query module may perform the query-by-example operation shown in Table 3 to determine the top-k number of source code files based on a query snippet input.

TABLE 3

Query-By-Example (snippet)

```
01: parser  = Resolve-AST-Parser(snippet)
02: ast     = parser.Parse(snippet)
03: V       = Generate-Vector(ast)
04: for i = 1 to V.length
05:    v = V[i]
06:    if v.treeSize > λ
07:       knn = Knn-Search (v, K, η)
08:       for each vector k in knn
09:          V_s = Hash-Get (k.sourceFile)
10:          Hash-Put(k.sourceFile, V_s U {k} )
11: i = 1
12: for each entry (sourceFile, V_s) in Hash-Entries( )
13:    S = Sort-Vectors(V_s)
14:    Remove-Redundant-Vectors(S)
15:    R[i].sourceFile = sourceFile
16:    line_prev = S[1].startLine
17:    for j = 1 to S.length
18:       v = S[j]
19:       R[i].lines = R[i].lines U {v.startLine}
20:       α = v.treeSize + v.parent.treeSize
21:       β = 1 - (v.startLine - line_prev) / (sourcefile.totalLines)
22:       R[i].score = R[i].score +v.similarity × (α + β)
23:       line_prev = v.endLine, i = i + 1
24: Sort-Score(R)
25: return R
```

In lines 1-2 of the Table 3, the query module may first determine an AST parser based on the source language of the query snippet. The AST parser may be configured to parse and generate a query AST "ast" based on the inputted query snippet. At line 3, the Generate-Vectors function may generate one or more characteristic vectors ("query vectors") based on the query AST, and associate meta-data such as source code file path, size of the sub-tree, start and end line numbers in the source code with the corresponding sub-trees in the query AST. In lines 4-10, the query module may utilize a "for" loop to filter out those query vectors with associated sub-tree size that is smaller than a predetermined and configurable threshold (λ). Afterward, the query module may invoke a k-nearest-neighbor (knn) search module with parameters including a specific query vector v, an integer K for the top-k number of source vectors to be returned, and a η for a maximum Euclidean distance.

In one embodiment, the query module may implement the knn search module by using a hash table having the query vector's associated root node type as hash key, and taking a list of source vectors whose associated root node type matches the hash key as hash table value set. Once obtained a set of source vectors that match the query vector, the knn search module may perform a linear scan over each one of the source vectors, and compute a corresponding Euclidean distance between the source vector and the query vector. Afterward, the query module may discard any source vector having a calculated Euclidean distance that is above the predetermined and configurable threshold η. Thus, the knn search module may return at most k number of source vectors that are deemed being similar to the query vector. Alternatively, the knn search module may be implemented using locality sensitive hash functions such as e2-1sh.

In one embodiment, in lines 8-10, the query module may add the source vectors returned by the knn search module to another hash table which is keyed by the source code file path associated with the source vector. In other words, after finished performing the "for loop" in lines 4-10, the query module may obtain a list of sub-trees of various source ASTs which are similar to various sub-trees of the query AST.

In one embodiment, the query module may compute a relevance score for each of the source code files. At line 12, the query module may iterate through the source code files having source vectors that match one or more of the query vectors. At line 13, the query module may sort the list of source vectors based on the increasing order of the source vectors' start lines in the specific source code file. At line 14, the query module may remove the redundant source vectors, which may be the source vectors that are subsumed or covered by other source vectors. In some cases, since all source vectors in the specific source code file are sorted into a sorted list based on their respective start lines, the query module may compare a first source vector with a second source vector which follows the first source vector in the sorted list. If the first source vector's end line is larger than the second source vector's start line, then the second source vector may be covered by the first source vector. And the query module may safely remove the second source vector for being redundant.

In lines 17-23, the query module may calculate a "relevance score" for the specific source code file based on its remaining source vectors. The "relevance score" may be a weighted sum of the similarity scores of the remaining source vectors. Specifically, the weights α (alpha) and β (beta) may be computed based on the following heuristics. The query module may give a larger weight α to a source vector having a larger tree size, since such a larger tree-size source vector may cover more lines of source code comparing to a smaller tree-size source vector. The query module may also give a larger weight α to a source vector having a larger parent tree size, since a larger parent tree size may indicate that the source code file containing more contents near the source code segment associated with the source vector. Further, the query module may give a larger weight β to a source vector if it is closer to another source vector in the source code file. In other words, the source code file may be more semantically related to the query snippet if there are matching source vectors that are near to each other.

In line 22, the query module may calculate the relevance score by accumulating the weighted similarity scores for each of the source vectors. In other words, the query module may adjust a similarity score for a specific source vector using the above weights α and β, and then added the weighted similarity score to the "relevance score" for the source code file. After calculating relevance scores for all the source code files, in lines 24-25, the query module may sort the relevance scores in a decreasing order, and return the k number of source code files having the top relevance scores.

In the following example, there are two source code files "foo" and "bar" in the source code repository. The query module may generate five source vectors for "foo" (fv1, fv2, fv3, fv4, and fv5), and generate 10 source vectors for "bar" (bv1, bv2, bv3, bv4, bv5, bv6, bv7, bv8, bv9, and bv10). The query module may further generate two query vectors for the query snippet received (qv1 and qv2). Thus, based on the above Table 3's query-by-example process, the query module may invoke the knn search module with parameters K=5 and η=10 for each of the query vectors qv1 and qv2. The knn search module may return a first matching set of source vectors (fv1, fv3, fv5, bv1, bv5, and bv10) for query vector qv1, and a second matching set of source vectors (fv2, fv4, bv2, bv7, and bv8) for query vector qv2.

In one embodiment, the query module may remove some redundant source vectors from the first matching set of source vectors and the second matching set of source vectors. For example, the query module may identify that fv1's associated sub-tree may contain fv3's sub-tree, and bv1's sub-tree may contain bv5 and bv10's sub-trees. The query module may remove the redundant source vectors from the first matching set of source vectors and the second matching set of source vectors. As a result, the remaining first matching set of source vectors may contain, e.g., fv1, fv5, and bv1, and the remaining second matching set of source vectors may contain, e.g., fv2, and bv2. In other words, for source code file "foo", there are two source vectors fv1 and fv5 that are found similar to the query vector qv1, and a source vector fv2 that is found similar to the query vector qv2.

In one embodiment, the query module may generate a corresponding relevance score for each of the "foo" and "bar", in order to determine which one of these two source code files may be more relevant to the query snippet. Assuming a first similarity score between fv1 and qv1 is sim1, and a second similarity score between fv2 and qv2 is sim2, and a third similarity score between fv5 and qv1 is sim5. Specifically, sim1, sim2, and sim5 should be smaller than the maximum Euclidean threshold η.

In one embodiment, the source vector fv1 may be associated with start line fv1_startline and end line fv1_endline in the source code file "foo", the source vector fv2 may be associated with start line fv2_startline and end line fv2_endline in "foo", and the source vector fv5 may be associated with start line fv5_startline and end line fv5_endline in "foo". Let's assume that fv1_startline<fv1_endline<fv2_startline<fv2_endline<fv5_startline<fv5_endline, and the total number of source code lines in "foo" may be "foo_totalLine." Let's further assume that the (tree size, parent tree size) for the source vectors fv1, fv2, and fv5 may be (fv1_treeSize, fv1_parentTreeSize), (fv2_treeSize, fv2_parentTreeSize), and (fv5_treeSize, fv5_parentTreeSize), respectively. Then the query module may calculate the weight factors ($\alpha$, $\beta$) for the source vectors fv1, fv2 and fv5 as the following (alpha1, beta1), (alpha2, beta2) and (alpha5, beta5), respectively:

$$alpha1 = fv1\_treeSize + fv1\_parentTreeSize$$

$$beta1 = 1$$

$$alpha2 = fv2\_treeSize + fv2\_parentTreeSize;$$

$$beta2 = 1 - (fv2\_startline - fv1\_endline)/foo\_totalLine$$

$$alpha5 = fv5\_treeSize + fv5\_parentTreeSize;$$

$$beta5 = 1 - (fv5\_startline - fv2\_endline)/foo\_totalLine$$

Thus, the relevance score for "foo" may be calculated based on the following:

$$Foo\_score = sim1*(alpha1+beta1) + sim2*(alpha2+beta2) + sim5*(alpha5+beta5)$$

Afterward, the query module may similarly calculate a relevance score for "bar", and rank the two source code files "foo" and "bar" based on their corresponding relevance scores.

Figure 5:
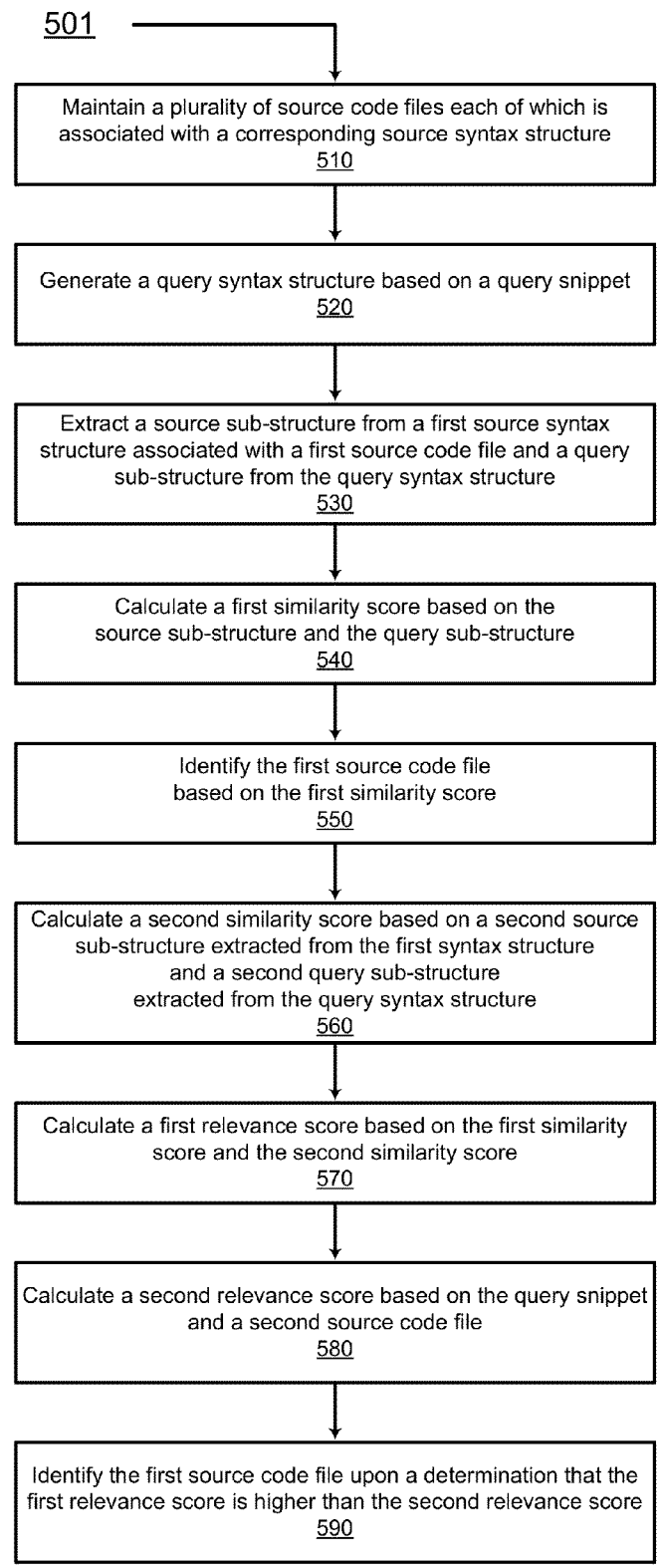
FIG. 5 shows a flow diagram illustrating one example process for performing query-by-example based on syntax structures.

FIG. 5 shows a flow diagram illustrating one example process 501 for performing query-by-example based on syntax structures, according to one or more embodiments of the present disclosure. The process 501 sets forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 5 may be practiced in various implementations.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Moreover, one or more of the outlined steps and operations may be performed in parallel.

At 510, a source code query system may be executing on a system. The source code query system may contain a query module, which may be configured to maintain a source code repository. The source code repository may contain a plurality of source code files. The query module may process each of the plurality of source code files, and generate a corresponding source syntax structure based on said each of the plurality of source code files. Afterward, the query module may associate the corresponding source syntax structure with the corresponding source code file in the source code repository.

At block 520, the query module may retrieve a query snippet from a request seeking one or more source code files that are relevant to the query snippet. The query module may generate a query syntax structure based on the query snippet. In one embodiment, the query syntax structure may be an abstract syntax tree ("query AST") containing a plurality of hierarchical nodes associated with syntactic elements extracted from the query snippet. The source syntax structures generated at block 510 may also be abstract syntax trees ("source ASTs").

At block 530, the query module may perform a query-by-example operation to identify a first source code file from the plurality of source code files for being relevant to the query snippet. The first source code file may be associated with a first source syntax structure. The query module may extract a source sub-structure from the first syntax structure for matching with a query sub-structure extracted from the query syntax structure. In one embodiment, the source sub-structure and the query sub-structure may be a "source sub-tree" of a source AST and a "query sub-tree" of a query AST, respectively. The query module may extract the source sub-structure and the query sub-structure upon a determination that the source sub-structure's size and the query sub-structure's size are above a predetermined size threshold. Further, the query module may extract the source sub-structure by evaluating whether the source sub-structure's root node and the query sub-structure's root node have a same node type.

At 540, the query module may calculate a first similarity score based on the source sub-structure and the query sub-structure. In a first embodiment, the query module may calculate the first similarity score by identifying a matching pattern contained in the source sub-structure and in the query sub-structure. Afterward, the query module may calculate a matching ratio based on the matching pattern, the source sub-structure's size, and the query sub-structure's size. In other words, the query module may compare the matching pattern's size with the source sub-structure's size and with the query sub-structure's size. Upon a determination that the matching ratio is above a predetermined matching ratio, the query module may assign the matching ratio as the first similarity score.

In a second embodiment, the query module may calculate the first similarity score by determining a tree edit distance between the source sub-structure and the query sub-structure. In a third embodiment, the query module may calculate the first similarity score by generating a source characteristic vector based on the source sub-structure, generating a query characteristic vector based on the query sub-structure, and calculating the first similarity score by determining a Euclidean distance between the source characteristic vector and the query characteristic vector. The generated source characteristic vector and the query characteristic vector may be 1-level n-dimension characteristic vectors. Further, the query module may generate the source characteristic vector by recursively generating a set of child characteristic vectors for child nodes in the source sub-structure, and generating the source characteristic vector by accumulating the set of child characteristic vectors.

At block 550, upon a determination that the first similarity score is above a predetermined similarity threshold, the query module may identify the first source code file as one of the source code files that are relevant to the query snippet. At block 560, the query module may calculate a second similarity score based on a second source sub-structure extracted from the first syntax structure that matches a second query sub-structure extracted from the query syntax structure. In other words, the query module may calculate a corresponding similarity score for each pair of matching source sub-structure and query sub-structure.

At block 570, the query module may calculate a first relevance score based on the first similarity score and the second similarity score. Specifically, the query module may generate the first relevance score by accumulating the similarity scores from one or more pairs of the matching source sub-structure and query sub-structure. Thus, the query module may utilize the first relevance score to determine whether the first source code file is relevant to the query snippet.

In one embodiment, the query module may apply weight factors to the similarity scores to adjust the relevance of the similarity scores in the relevance score. For example, the query module may optionally adjust the first similarity score based on a first size of the first source sub-structure (e.g., the tree size for the source sub-structure) and a second size of a parent sub-structure of the first source sub-structure (e.g., the tree size of a parent sub-tree that contains the source sub-tree). In other words, the query module may adjust the first similarity score using the tree size and parent tree size as weight factors (similar to the "alpha" factor previously described). The query module may further adjust the first similarity score utilizing a location (e.g., start line, end line) of the first source sub-structure in the first source code file as another weight factor (similar to the "beta" factor previous described).

At block 580, the query module may select a second source code file from the plurality of source code files, and calculate a second relevance score for the second source code file, similar to the calculating of the first relevance score for the first source code file described above. At block 590, the query module may identify the first source code file upon a determination that the first relevance score is higher than a second relevance score calculated based on the query snippet and a second source code file selected from the plurality of the source code files.

Figure 6:
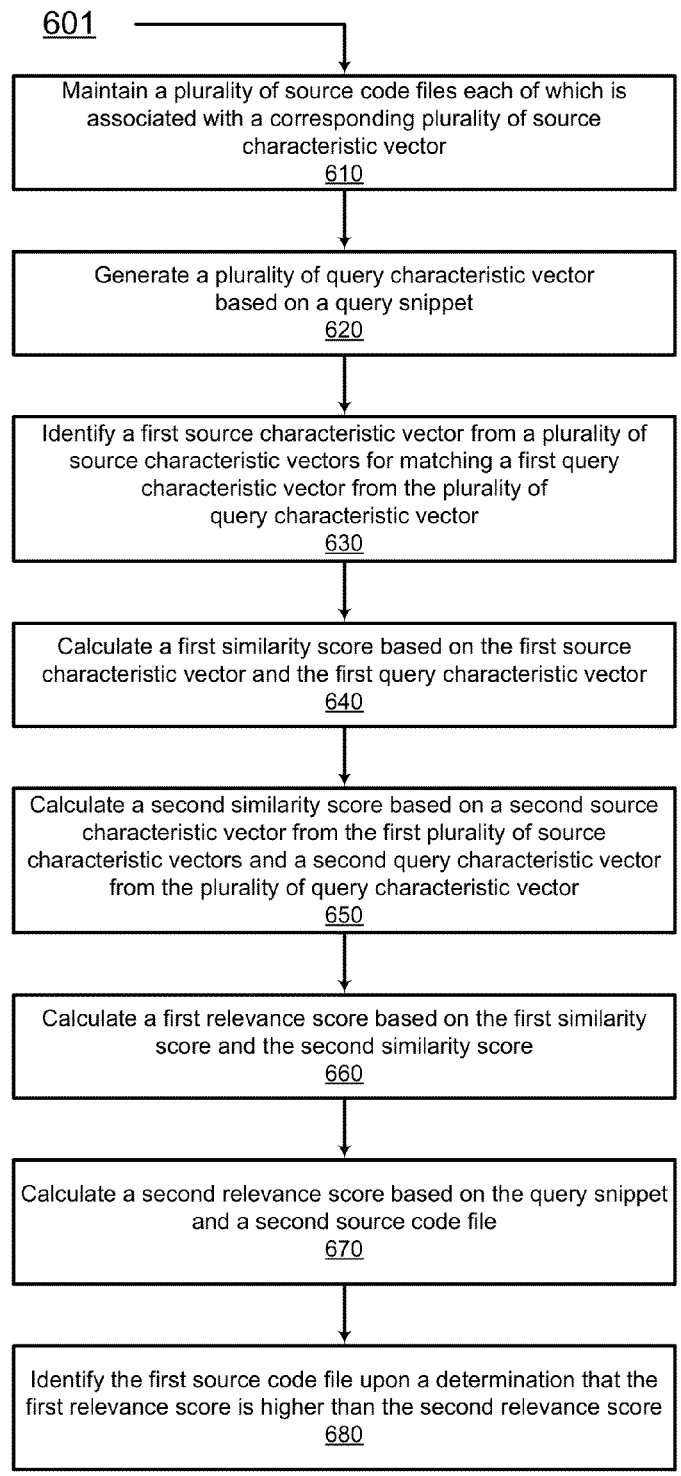
FIG. 6 shows a flow diagram illustrating one example process for performing query-by-example based on characteristic vectors, all arranged in accordance to at least one or more embodiments of the present disclosure.

FIG. 6 shows a flow diagram illustrating one example process 601 for performing query-by-example based on characteristic vectors, according to one embodiment of the present disclosure. The process 601 sets forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 6 may be practiced in various implementations.

At block 610, a source code query system may be executing on a system. The source code query system may contain a query module, which may be configured to maintain a source code repository. The source code repository may contain a plurality of source code files. The query module may process each of the plurality of source code files, and generate a corresponding plurality of source characteristic vectors based on said each of the plurality of source code files. Afterward, the query module may associate the corresponding plurality of source characteristic vectors with the corresponding source code file in the source code repository.

At block 620, the query module may retrieve a query snippet from a request seeking one or more source code files that are relevant to the query snippet. The query module may generate a plurality of query characteristic vectors based on the query snippet. In one embodiment, the query module may generate a syntax structure based on the query snippet. The syntax structure may contain a plurality of hierarchical nodes associated with syntactic elements extracted from the query snippet. Afterward, the query module may recursively generate the plurality of query characteristic vectors by processing each one of the plurality of hierarchical nodes.

At block 630, the query module may perform a query-by-example operation to identify a first source code file from the plurality of source code files for being relevant to the query snippet. The first source code file may be associated with a first plurality of source characteristic vectors. The query module may identify a first source characteristic vector from the first plurality of source characteristic vectors for matching a first query characteristic vector selected from the plurality of query characteristic vectors.

At block 640, the query module may calculate a first similarity score based on the first source characteristic vector and the first query characteristic vector. Specifically, the query module may calculate the first similarity score by determining a Euclidean distance between the first source characteristic vector and the first query characteristic vector. In one embodiment, upon a determination that the first similarity score is above a predetermined similarity threshold, the query module may identify the first source code file as one of the source code files that are relevant to the query snippet. In another embodiment, upon a determination that a second source characteristic vector selected from the first plurality of source characteristic vectors subsumes (covers) the first source characteristic vector and matches the first query characteristic vector, the query module may calculate the first similarity score based on the second characteristic vector and the first query characteristic vector.

At bock 650, the query module may calculate a second similarity score based on a second source characteristic vector selected from the plurality of source characteristic vectors and a second query characteristic vector selected from the plurality of query characteristic vectors, similar to the calculation of the first similarity score described above.

At block 660, the query module may calculate a first relevance score based on the first similarity score and the second similarity score. Further, the query module may calculate the first relevance score by adjusting the first similarity score based on a first size of a first portion of the first source code file related to the first source characteristic vector, a second size of a second portion of the first source code file that covers the first portion, or a location of the first source code file associated with the first source characteristic vector.

At block 670, the query module may select a second source code file from the plurality of source code files, and calculate a second relevance score for the second source code file, similar to the calculating of the first relevance score for the first source code file described above.

At block 680, the query module may identify the first source code file upon a determination that the first relevance score is higher than the second relevance score calculated based on the query snippet and the second source code file selected from the plurality of the source code files. Thus, the first source code file may be deemed relevant to the query snippet based on the first relevance score and the second relevance score.

Systems and methods for performing query-by-example have been disclosed. The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term computer readable storage medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A system configured to perform query-by-example, the system comprising a processor and a memory coupled with the processor, wherein the memory is configured to provide the processor with instructions for:
    maintaining, by a query module executing on the system, a source code repository containing a plurality of source code files, wherein each of the plurality of source code files is associated with a corresponding source syntax structure generated based on said each of the plurality of source code files and representative of a syntactic structure of said each of the plurality of source code files;
    receiving, by the query module, a query snippet;
    generating, by the query module, a query syntax structure based on the query snippet, wherein the query syntax structure represents a syntactic structure of the query snippet; and
    identifying, by the query module, a first source code file from the plurality of source code files for being relevant to the query snippet by:
    extracting a source sub-structure from a first syntax structure associated with the first source code file for matching with a query sub-structure extracted from the query syntax structure,
    identifying a matching pattern contained in the source sub-structure and in the query sub-structure,
    calculating a matching ratio based on the matching pattern, the source sub-structure's size, and the query sub-structure's size, and
    assigning the matching ratio as a first similarity score upon a second determination that the matching ratio is above a predetermined matching threshold, and
    identifying the first source code file upon a first determination that the first similarity score is above a predetermined similarity threshold, wherein the being relevant to the query snippet is determined by a first relevance score which is calculated based on the query syntax structure and the first source code file's corresponding source syntax structure.

2. The system of claim 1, wherein the query syntax structure is a syntax tree containing a plurality of hierarchical nodes associated with syntactic elements extracted from the query snippet.

3. The system of claim 1, wherein the source sub-structure's size and the query sub-structure's size are above a predetermined size threshold, and the source sub-structure's root node and the query sub-structure's root node have a same node type.

4. The system of claim 1, wherein calculating the first similarity score comprises:
   calculating the first similarity score by determining a tree edit distance between the source sub-structure and the query sub-structure.

5. The system of claim 1, wherein calculating the first similarity score comprises:
   generating a source characteristic vector based on the source sub-structure;
   generating a query characteristic vector based on the query sub-structure; and
   calculating the first similarity score by determining a Euclidean distance between the source characteristic vector and the query characteristic vector.

6. The system of claim 5, wherein the source characteristic vector is a 1-level characteristic vector, and generating the source characteristic vector comprises:
   recursively generating a set of child characteristic vectors for child nodes in the source sub-structure; and
   generating the source characteristic vector by accumulating the set of child characteristic vectors.

7. The system of claim 1, wherein identifying the first source code file from the plurality of source code files comprises:
   calculating a first similarity score based on a first source sub-structure extracted from the first syntax structure that matches a first query sub-structure extracted from the query syntax structure;
   calculating a second similarity score based on a second source sub-structure extracted from the first syntax structure that matches a second query sub-structure extracted from the query syntax structure;
   calculating the first relevance score based on the first similarity score and the second similarity score; and
   identifying the first source code file upon a determination that the first relevance score is higher than a second relevance score calculated based on the query snippet and a second source code file selected from the plurality of the source code files.

8. The system of claim 7, wherein calculating the first relevance score comprises:
   calculating the first relevance score by adjusting the first similarity score based on a first size of the first source sub-structure, a second size of a parent sub-structure of the first source sub-structure, or a location of the first source sub-structure in the first source code file.

9. A method for performing query-by-example, the method being performed in a system comprising a processor and a memory coupled with the processor, the method comprising:
   maintaining, by a query module executing on the system, a source code repository containing a plurality of source code files, wherein each of the plurality of source code files is associated with a corresponding source syntax structure generated based on said each of the plurality of source code files and representative of a syntactic structure of said each of the plurality of source code files;
   receiving, by the query module, a query snippet;
   generating, by the query module, a query syntax structure based on the query snippet, wherein the query syntax structure represents a syntactic structure of the query snippet; and
   identifying, by the query module, a first source code file from the plurality of source code files for being relevant to the query snippet by:
   extracting a source sub-structure from a first syntax structure associated with the first source code file for matching with a query sub-structure extracted from the query syntax structure,
   identifying a matching pattern contained in the source sub-structure and in the query sub-structure,
   calculating a matching ratio based on the matching pattern, the source sub-structure's size, and the query sub-structure's size, and
   assigning the matching ratio as a first similarity score upon a second determination that the matching ratio is above a predetermined matching threshold, and
   identifying the first source code file upon a first determination that the first similarity score is above a predetermined similarity threshold, wherein the being relevant to the query snippet is determined by a first relevance score which is calculated based on the query syntax structure and the first source code file's corresponding source syntax structure.

10. The method of claim 9, wherein the query syntax structure is a syntax tree containing a plurality of hierarchical nodes associated with syntactic elements extracted from the query snippet.

11. The method of claim 9, wherein the source sub-structure's size and the query sub-structure's size are above a predetermined size threshold, and the source sub-structure's root node and the query sub-structure's root node have a same node type.

12. The method of claim 9, wherein calculating the first similarity score comprises:
   calculating the first similarity score by determining a tree edit distance between the source sub-structure and the query sub-structure.

13. The method of claim 9, wherein calculating the first similarity score comprises:
   generating a source characteristic vector based on the source sub-structure;
   generating a query characteristic vector based on the query sub-structure; and
   calculating the first similarity score by determining a Euclidean distance between the source characteristic vector and the query characteristic vector.

14. The method of claim 13, wherein the source characteristic vector is a 1-level characteristic vector, and generating the source characteristic vector comprises:
   recursively generating a set of child characteristic vectors for child nodes in the source sub-structure; and
   generating the source characteristic vector by accumulating the set of child characteristic vectors.

15. The method of claim 9, wherein identifying the first source code file from the plurality of source code files comprises:
   calculating a first similarity score based on a first source sub-structure extracted from the first syntax structure that matches a first query sub-structure extracted from the query syntax structure;
   calculating a second similarity score based on a second source sub-structure extracted from the first syntax structure that matches a second query sub-structure extracted from the query syntax structure;
   calculating the first relevance score based on the first similarity score and the second similarity score; and
   identifying the first source code file upon a determination that the first relevance score is higher than a second relevance score calculated based on the query snippet and a second source code file selected from the plurality of the source code files.

16. The method of claim 15, wherein calculating the first relevance score comprises:
    calculating the first relevance score by adjusting the first similarity score based on a first size of the first source sub-structure, a second size of a parent sub-structure of the first source sub-structure, or a location of the first source sub-structure in the first source code file.

17. A non-transitory computer-readable storage medium that includes a set of instructions which, in response to execution by a processor, cause the processor to perform a method for performing query-by-example, the method being performed in a system comprising a processor and a memory coupled with the processor, the method comprising:
    maintaining, by a query module executing on the system, a source code repository containing a plurality of source code files, wherein each of the plurality of source code files is associated with a corresponding source syntax structure generated based on said each of the plurality of source code files and representative of a syntactic structure of said each of the plurality of source code files;
    receiving, by the query module, a query snippet;
    generating, by the query module, a query syntax structure based on the query snippet, wherein the query syntax structure represents a syntactic structure of the query snippet; and
    identifying, by the query module, a first source code file from the plurality of source code files for being relevant to the query snippet by:
        extracting a source sub-structure from a first syntax structure associated with the first source code file for matching with a query sub-structure extracted from the query syntax structure,
        identifying a matching pattern contained in the source sub-structure and in the query sub-structure,
        calculating a matching ratio based on the matching pattern, the source sub-structure's size, and the query sub-structure's size, and
        assigning the matching ratio as a first similarity score upon a second determination that the matching ratio is above a predetermined matching threshold, and identifying the first source code file upon a first determination that the first similarity score is above a predetermined similarity threshold, wherein the being relevant to the query snippet is determined by a first relevance score which is calculated based on the query syntax structure and the first source code file's corresponding source syntax structure.

18. The non-transitory computer-readable storage medium of claim 17, wherein calculating the first similarity score comprises:
    generating a source characteristic vector based on the source sub-structure;
    generating a query characteristic vector based on the query sub-structure; and
    calculating the first similarity score by determining a Euclidean distance between the source characteristic vector and the query characteristic vector.

19. The non-transitory computer-readable storage medium 17, wherein the source characteristic vector is a 1-level characteristic vector, and generating the source characteristic vector comprises:
    recursively generating a set of child characteristic vectors for child nodes in the source sub-structure; and
    generating the source characteristic vector by accumulating the set of child characteristic vectors.

20. The non-transitory computer-readable storage medium of claim 17, wherein identifying the first source code file from the plurality of source code files comprises:
    calculating a first similarity score based on a first source sub-structure extracted from the first syntax structure that matches a first query sub-structure extracted from the query syntax structure;
    calculating a second similarity score based on a second source sub-structure extracted from the first syntax structure that matches a second query sub-structure extracted from the query syntax structure;
    calculating the first relevance score based on the first similarity score and the second similarity score; and
    identifying the first source code file upon a determination that the first relevance score is higher than a second relevance score calculated based on the query snippet and a second source code file selected from the plurality of the source code files.

* * * * *